DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 5

T903,005
TEXTURING THE SURFACE OF A PHOTOGRAPHIC DIFFUSION TRANSFER PRINT

Paul A. Camello, Randolph, Mass., assignor to Polaroid Corporation, Cambridge, Mass.

Filed July 2, 1971, Ser. No. 159,253
**Int. Cl. B44c *1/16***
U.S. Cl. 96—27
1 Sheet Drawing. 14 Pages Specification

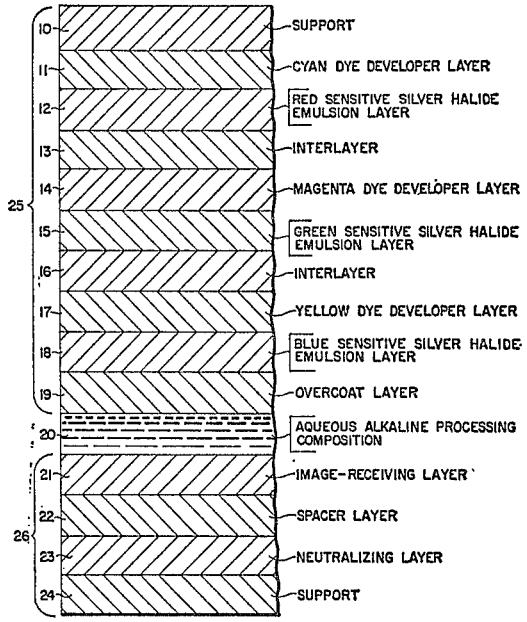

Distinctive photographic products are obtained by separating the support member from a diffusion transfer image bearing element. The residual portion of the diffusion transfer element, e.g., that portion bearing the image pattern can then be applied to a substrate having a surface which can provide a predesired antique or textural effect for the image pattern carrying member. Photographic products produced in accordance with the present invention closely resemble painted miniature portraits or similar specialized photographic products of this type.

Oct. 3, 1972
P. A. CAMELLO
TEXTURING THE SURFACE OF A PHOTOGRAPHIC DIFFUSION TRANSFER PRINT
Filed July 2, 1971
T903,005
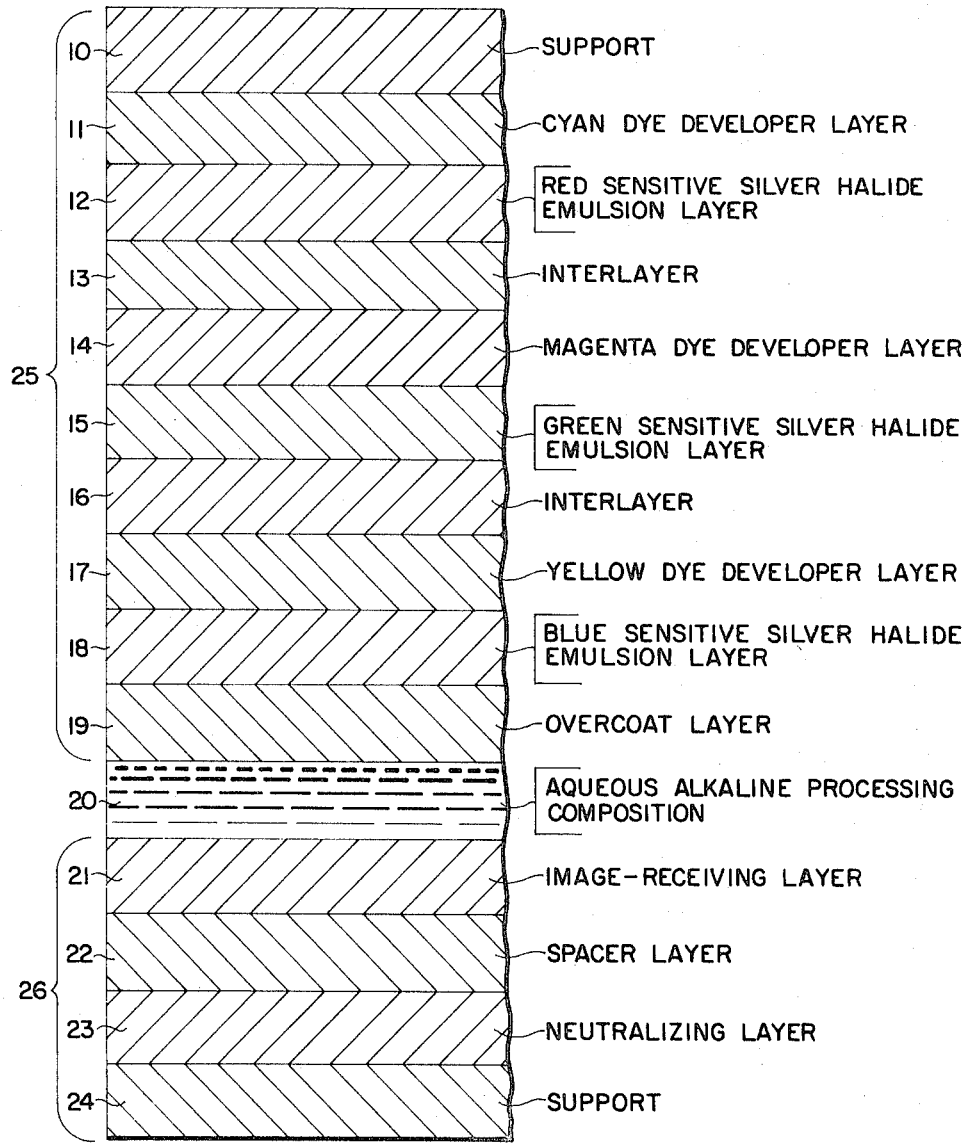
INVENTOR.
PAUL A. CAMELLO
BY
Brown and Mikulka
and
John P. Morley
ATTORNEYS